(12) United States Patent
Howe et al.

(10) Patent No.: US 10,830,052 B2
(45) Date of Patent: Nov. 10, 2020

(54) GAS TURBINE COMPONENT WITH COOLING APERTURE HAVING SHAPED INLET AND METHOD OF FORMING THE SAME

(71) Applicant: HONEYWELL INTERNATIONAL INC., Morris Plains, NJ (US)

(72) Inventors: Jeff Howe, Chandler, AZ (US); Luis Tapia, Maricopa, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 786 days.

(21) Appl. No.: 15/266,481

(22) Filed: Sep. 15, 2016

(65) Prior Publication Data

US 2018/0073368 A1 Mar. 15, 2018

(51) Int. Cl.
| | |
|---|---|
| *B22C 9/04* | (2006.01) |
| *B22C 9/10* | (2006.01) |
| *B22C 7/02* | (2006.01) |
| *F01D 5/18* | (2006.01) |
| *F02K 3/06* | (2006.01) |
| *F01D 9/06* | (2006.01) |

(52) U.S. Cl.
CPC ............... *F01D 5/186* (2013.01); *B22C 7/02* (2013.01); *B22C 9/04* (2013.01); *B22C 9/10* (2013.01); *F02K 3/06* (2013.01); *F01D 9/065* (2013.01); *F05D 2220/32* (2013.01); *F05D 2230/21* (2013.01); *F05D 2230/211* (2013.01); *F05D 2250/323* (2013.01); *F05D 2250/511* (2013.01); *F05D 2260/202* (2013.01); *Y02T 50/676* (2013.01)

(58) Field of Classification Search
CPC ................ B22C 7/02; B22C 9/04; B22C 9/10
USPC ..................................................... 164/28, 369
See application file for complete search history.

(56) References Cited

U.S. PATENT DOCUMENTS

| 4,565,490 A | 1/1986 | Rice |
|---|---|---|
| 4,992,025 A | 2/1991 | Stroud et al. |
| 5,059,093 A | 10/1991 | Khalid et al. |

(Continued)

FOREIGN PATENT DOCUMENTS

| EP | 0992654 A2 | 4/2000 |
|---|---|---|
| EP | 2777842 A1 | 9/2014 |

(Continued)

OTHER PUBLICATIONS

Dittman, M. et al; Discharge Coefficients of Rotating Short Orifices With Radiused and Chamfered Inlets; Journal of Engineering for Gas Turbines and Power, Oct. 2004, vol. 126. Copyright 2004.

(Continued)

*Primary Examiner* — Kevin P Kerns
(74) *Attorney, Agent, or Firm* — Lorenz & Kopf, LLP (57) ABSTRACT

A method of manufacturing a cooled gas turbine component includes forming a core with an outer surface. The outer surface includes a core feature. The method also includes casting an outer wall of an airfoil about the core. The outer wall has an exterior surface and an interior surface. The interior surface includes a shaped inlet portion that corresponds to the core feature. Moreover, the method includes forming an outlet portion through the outer wall to fluidly connect the outlet portion to the shaped inlet portion. The shaped inlet portion and the outlet portion cooperatively define a cooling aperture through the outer wall.

20 Claims, 11 Drawing Sheets

(56) References Cited

U.S. PATENT DOCUMENTS

| | | |
|---|---|---|
| 5,222,617 A | 6/1993 | Gregory et al. |
| 5,700,131 A | 12/1997 | Hall et al. |
| 6,241,468 B1 | 6/2001 | Lock et al. |
| 6,616,405 B2 | 9/2003 | Torii et al. |
| 7,059,825 B2 | 6/2006 | Magowan et al. |
| 7,237,595 B2 | 7/2007 | Beck et al. |
| 8,522,557 B2 | 9/2013 | Dawson et al. |
| 8,628,292 B2 | 1/2014 | Maltson |
| 8,858,176 B1 | 10/2014 | Liang |
| 9,057,277 B2 | 6/2015 | Appleby et al. |
| 9,249,679 B2 | 2/2016 | Berkebile et al. |
| 9,296,039 B2 | 3/2016 | Propheter-Hinckley et al. |
| 9,394,798 B2 | 7/2016 | Crites et al. |
| 2011/0132562 A1 | 6/2011 | Merrill et al. |
| 2011/0162387 A1 | 7/2011 | Chir et al. |
| 2013/0156602 A1 | 6/2013 | Santoro et al. |
| 2014/0050938 A1 | 2/2014 | Lin et al. |
| 2016/0061451 A1 | 3/2016 | Dudebout et al. |
| 2017/0306764 A1 | 10/2017 | Konitzer et al. |
| 2018/0274370 A1 | 9/2018 | Bunker et al. |

FOREIGN PATENT DOCUMENTS

| | | |
|---|---|---|
| EP | 2995773 A1 | 3/2016 |
| WO | 2013037662 A1 | 3/2013 |
| WO | 2016022140 A1 | 2/2016 |

OTHER PUBLICATIONS

Extended EP Search Report for Application No. 17190484.0 dated Feb. 15, 2018.

EP Examination Report for Application No. 17190 484.0-1103 dated Jul. 26, 2018.

EP Examination Report for Application No. 17190 484.0-1103 dated Nov. 21, 2018.

GAS TURBINE COMPONENT WITH COOLING APERTURE HAVING SHAPED INLET AND METHOD OF FORMING THE SAME

TECHNICAL FIELD

The present disclosure generally relates to a gas turbine component and, more particularly, relates to a gas turbine component with a cooling aperture having a shaped inlet and a method of forming the same.

BACKGROUND

Gas turbine engines are generally used in a wide range of applications, such as aircraft engines and auxiliary power units. In a gas turbine engine, air is compressed in a compressor, mixed with fuel, and ignited in a combustor to generate hot combustion gases, which flow downstream into a turbine section. In a typical configuration, the turbine section includes airfoils, such as stator vanes and rotor blades, disposed in an alternating sequence along the axial length of a generally annular hot gas flow path. The rotor blades are mounted at the periphery of one or more rotor disks that are coupled in turn to a main engine shaft. Hot combustion gases are delivered from the engine combustor to the annular hot gas flow path, thus resulting in rotary driving of the rotor disks to provide an engine output.

Due to the high temperatures in many gas turbine engine applications, it is desirable to regulate the operating temperature of certain engine components, particularly those within the mainstream hot gas flow path in order to prevent overheating and potential mechanical issues attributable thereto. As such, it is desirable to cool the airfoils of the rotor blades and stator vanes to prevent or reduce oxidation, thermo-mechanical fatigue, and/or other adverse impacts to the airfoil. Mechanisms for cooling turbine airfoils include ducting cooling air through internal passages and then venting the cooling air through holes formed in the airfoil. However, given the high temperature of engine operation, cooling remains a challenge.

Accordingly, it is desirable to provide gas turbine engines with improved airfoil cooling. Furthermore, other desirable features and characteristics of the present invention will become apparent from the subsequent detailed description of the invention and the appended claims, taken in conjunction with the accompanying drawings and this background of the invention.

BRIEF SUMMARY

In one embodiment, a method of manufacturing a gas turbine component for a gas turbine engine is disclosed. The method includes forming a core with an outer surface. The outer surface includes a core feature. The method also includes casting an outer wall of an airfoil about the core. The outer wall has an exterior surface and an interior surface. The interior surface includes a shaped inlet portion that corresponds to the core feature. Moreover, the method includes forming an outlet portion through the outer wall to fluidly connect the outlet portion to the shaped inlet portion. The shaped inlet portion and the outlet portion cooperatively define a cooling aperture through the outer wall.

In another embodiment, a cooled gas turbine component for a gas turbine engine is disclosed. The gas turbine component includes an airfoil. Also, the gas turbine component includes an outer wall of the airfoil. The outer wall has an exterior surface and an interior surface. Also, the gas turbine component includes a cooling aperture that extends through the outer wall. The cooling aperture includes a cast inlet portion included on the interior surface. The cooling aperture also includes an outlet portion extending through the outer wall and fluidly connected to the inlet portion. The inlet portion has a width and a depth, and the width of the inlet portion gradually reduces along the depth of the inlet portion toward the outlet portion.

BRIEF DESCRIPTION OF THE DRAWINGS

The present disclosure will hereinafter be described in conjunction with the following drawing figures, wherein like numerals denote like elements, and wherein:

FIGS. 6-20B are schematic views illustrating the method of FIG. 5; and

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, exemplary embodiments disclosed herein include gas turbine engines with turbine components having improved cooling characteristics. Methods of manufacturing the turbine components are also disclosed. In particular, exemplary embodiments include turbine airfoils with an outer wall having at least one cooling aperture with a shaped inlet. The shaped inlet may increase flow rate through the cooling aperture for improved cooling. Additionally, methods of manufacturing the turbine component may include casting the shaped inlet and subsequently forming an outlet of the cooling aperture through the casting to fluidly connect the outlet to the shaped inlet. Additionally, in some embodiments, the cooling aperture may be adjusted (e.g., by widening the hole and/or changing the axis of the outlet) to change flow characteristics of the cooling aperture. Other details of the present disclosure will be discussed below.

Figure 1:
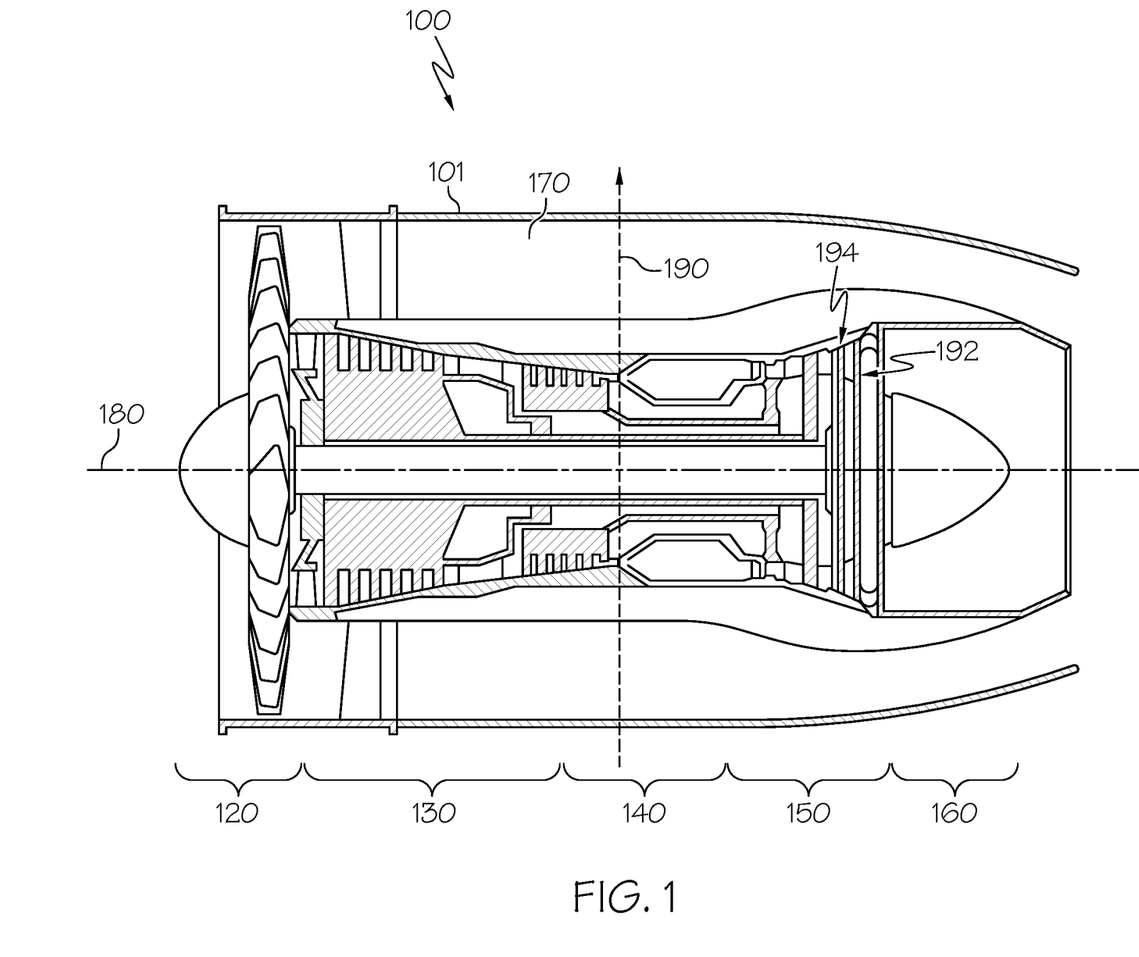
FIG. 1 is a schematic side view of a gas turbine engine according to exemplary embodiments of the present disclosure.

FIG. 1 is a cross-sectional view of a gas turbine engine 100 according to an exemplary embodiment. Although FIG. 1 depicts a turbofan engine, in general, exemplary embodiments discussed herein may be applicable to another type of engine without departing from the scope of the present disclosure. The gas turbine engine 100 may form part of, for example, an auxiliary power unit for an aircraft or a propulsion system for an aircraft. However, the gas turbine engine 100 may be included on another vehicle without departing from the scope of the present disclosure. Instead of being included on a vehicle, the gas turbine engine 100 may also be supported by a stationary mount in some embodiments.

The gas turbine engine 100 has an overall construction and operation that is generally understood by persons skilled in the art. The gas turbine engine 100 may be disposed in an engine case 101 and may include a fan section 120, a compressor section 130, a combustion section 140, a turbine section 150, and an exhaust section 160, which are arranged sequentially along a longitudinal axis 180. As used herein, the term "axial" refers to a direction generally parallel to the longitudinal axis 180. A radial axis 190 is also included in FIG. 1 for reference purposes. The term "radial" as used herein refers to a direction generally parallel to the radial axis 190 and perpendicular to the longitudinal axis 180.

The fan section 120 may include a fan, which draws in and accelerates air. A fraction of the accelerated air from the fan section 120 is directed through a bypass section 170 to provide a forward thrust. The remaining fraction of air exhausted from the fan is directed into the compressor section 130.

The compressor section 130 may include a series of compressors that raise the pressure of the air directed into it from the fan section 120. The compressors may direct the compressed air into the combustion section 140.

In the combustion section 140, the high pressure air is mixed with fuel and combusted. The combusted air is then directed into the turbine section 150.

The turbine section 150 may include a series of rotor assemblies 192 and stator assemblies 194, both of which are represented schematically in FIG. 1. The combusted air from the combustion section 140 expands through the rotor and stator assemblies 192, 194 and causes the rotor assemblies 192 to rotate a main engine shaft for energy extraction. The air is then exhausted through a propulsion nozzle disposed in the exhaust section 160 to provide additional forward thrust.

Figure 2:
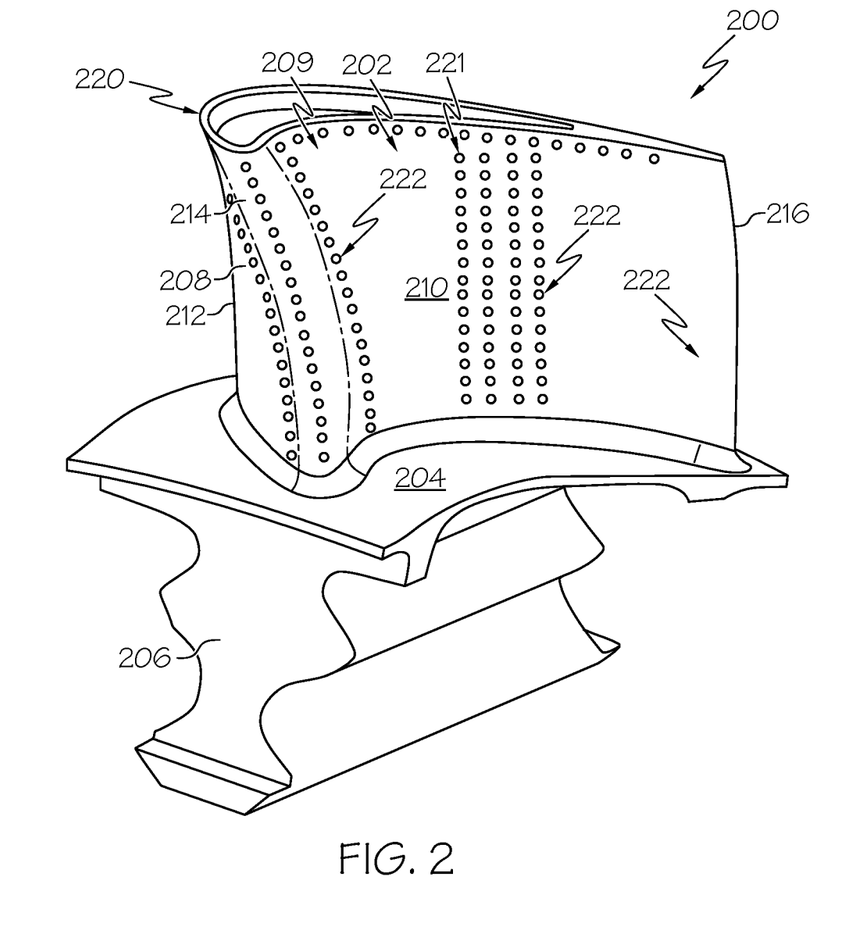
FIG. 2 is a perspective view of a gas turbine component of the gas turbine engine according to exemplary embodiments of the present disclosure.

Within the turbine section 150, the rotor assemblies 192 may include a plurality of rotor blades 200, an example embodiment of which is illustrated in FIG. 2. As is known, the rotor blade 200 may be mounted on a rotor disc, which in turn is coupled to the engine shaft. A turbine stator directs the air toward the rotor blade 200. The air impinges upon the rotor blade 200, thereby driving the rotor assembly 192 for power extraction.

To allow the turbine section 150 to operate at desirable elevated temperatures, certain components are cooled. For example, in some embodiments, the rotor blade 200 may include cooling apertures that include one or more features of the present disclosure. In additional embodiments, one or more of the stator assemblies 194 (e.g., an airfoil of the stator assembly 194) may include the cooling apertures of the present disclosure. As will be discussed, the cooling aperture may include a shaped inlet portion. The shaped inlet portion provides increased flow for improved cooling. Manufacturing techniques are also discussed below for providing the shaped inlet portion to one or more of these turbine components.

FIG. 2 illustrates an exemplary aircraft jet engine turbine rotor blade 200. It will be appreciated that the rotor blade 200 may have alternate configurations or arrangements without departing from the scope of the present disclosure.

The rotor blade 200 includes an airfoil 202, a platform 204, and a root 206. The platform 204 is configured to radially contain turbine airflow within a shroud of the turbine section 150. The root 206 extends from the underside of the platform 204 and is configured to couple the blade 200 to a turbine rotor disc (not shown). In general, the rotor blade 200 may be made from any suitable material, including high heat and high stress resistant aerospace alloys, such as nickel based alloys, Mar-M-247, single crystal materials, directionally solidified materials, or others.

The airfoil 202 projects radially outwardly from the platform 204 and terminates at a blade tip 220. The airfoil 202 is formed by a body 208 with an outer wall 209. The outer wall 209 may include a first portion 210 and a second portion 212 that cooperate to define an airfoil shape. The first portion 210 of the outer wall 209 defines a pressure side with a generally concave shape, and the second portion 212 of the outer wall 209 defines a suction side with a generally convex shape. In a chordwise direction, the portions 210, 212 of the outer wall 209 are joined at a leading edge 214 and trailing edge 216. As used herein, the term "chordwise" refers to a generally longitudinal dimension along the airfoil 202 from the leading edge 214 to the trailing edge 216.

As noted above, the rotor blade 200, particularly the airfoil 202, may be subject to extremely high temperatures resulting from high velocity hot gases ducted from the combustion section 140 (FIG. 1). If unaddressed, the extreme heat may affect the useful life of an airfoil and/or impact the maximum operating temperature of the engine. Accordingly, cooling is provided for the rotor blade 200 (e.g., to the airfoil 202) to maintain blade temperature at an acceptable level, as described in greater detail below. Such cooling may include an internal cooling system 221 that directs cooling air from the compressor section 130 into inlets in the root 206 and through internal cavities and passages of the blade 200 to cool the airfoil 202 via convection and conduction. The air flowing through the internal cooling system 221 may flow out of the airfoil 202 through one or more cooling apertures 222, which are shown in FIG. 2.

The cooling apertures 222 may extend through the outer wall 209. It will be appreciated that the number of cooling apertures 222 and the arrangement of the cooling apertures 222 may vary without departing from the scope of the present disclosure. The cooling apertures 222 may be relatively small and arranged generally in rows and/or columns on the airfoil 202, proximate the leading edge 214, the blade tip 220, and/or other areas of the airfoil 202. As shown in FIG. 2, the cooling apertures 222 may be substantially circular. The cooling apertures 222 may provide cooling airflow to the leading edge 214, the blade tip 220, and/or to areas of the blade 202 between the leading and trailing edges 216.

In some embodiments, the cooling apertures 222 may provide film cooling to the blade 200. Specifically, the cooling apertures 222 may be arranged to provide a cooling film of fluid onto the exterior surface (i.e., the hot side surface) of the airfoil 202.

Figure 3:
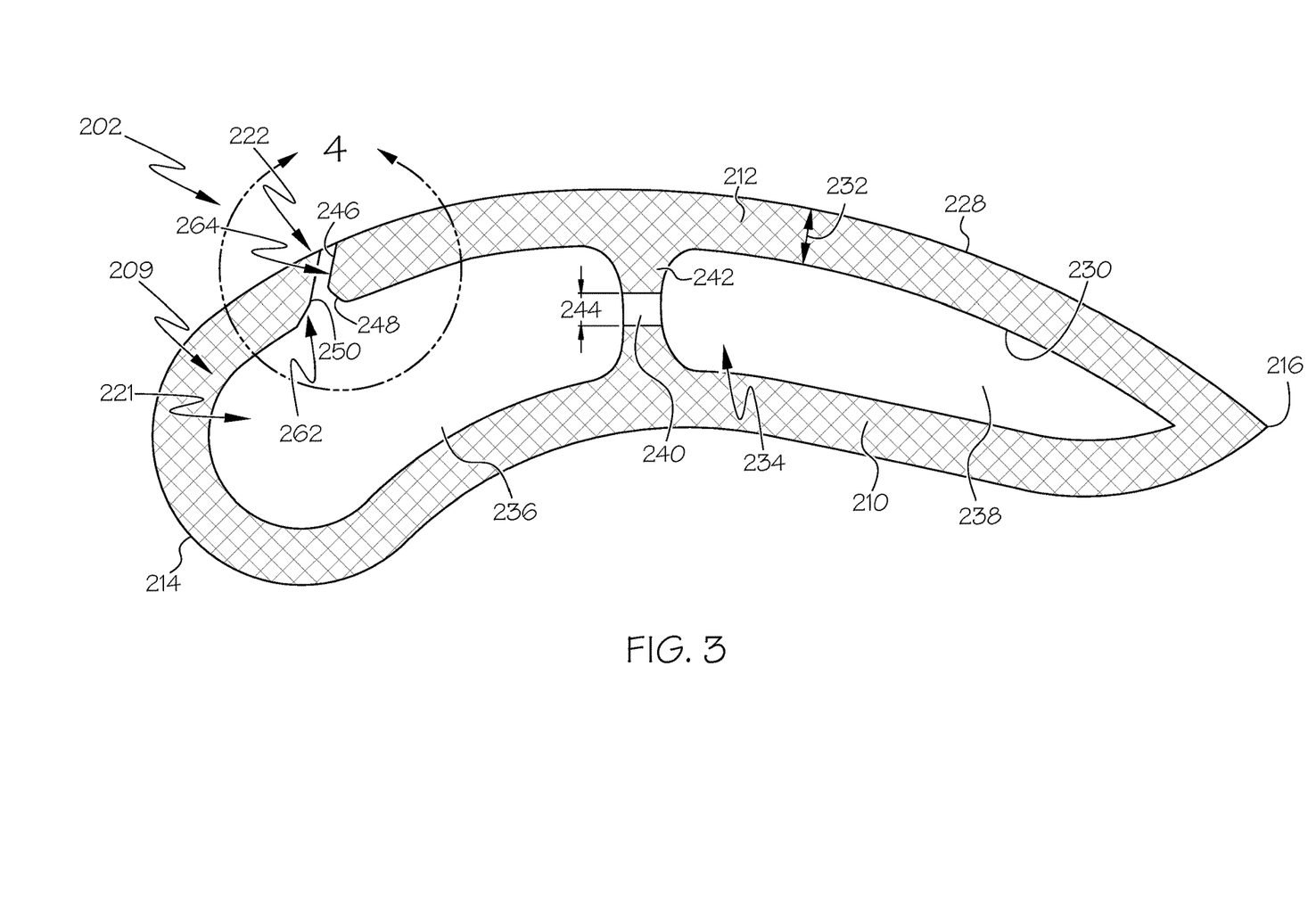
FIG. 3 is a section view of an airfoil of the gas turbine component of FIG. 2.

FIG. 3 is a cross-sectional view of the airfoil 202 of FIG. 2 in accordance with an exemplary embodiment. As shown, the cross-sectional view may generally correspond to a cross-sectional view through an axial-chordwise plane. It will be appreciated that the cross section of FIG. 3 may represent a simplified embodiment and that the airfoil 202 may include additional features that are not illustrated.

As discussed above, the airfoil 202 may include the outer wall 209 with first and second portions 210, 212 joined at the leading edge 214 and the trailing edge 216. As shown in FIG. 3, the outer wall 209 includes an exterior surface 228 and an interior surface 230. The outer wall 209 may have a thickness 232, which is measured between the exterior surface 228 and the interior surface 230. In some embodiments, the outer wall 209 may define a shell-like outer periphery of the airfoil 202.

Also, as noted above, the airfoil 202 may include the cooling system 221, which cools the airfoil 202. Various features of the cooling system 221 will be described in detail below according to exemplary embodiments.

It will be appreciated that, although the cooling system 221 is shown and described in relation to the airfoil 202 of the rotor blade 200, one or more features of the cooling system 221 may be incorporated within another area of the rotor blade 200 and/or within another turbine component. For example, the cooling system 221 may be incorporated within a stator assembly 194 of the turbine section 150 of the engine 100 without departing from the scope of the present disclosure.

In exemplary embodiments, the cooling system 221 may form part of a high efficiency, multi-walled turbine airfoil cooling arrangement or a serpentine airfoil cooling arrangement. Other cooling systems 221 may be provided, including those of different wall and cavity structures.

The cooling system 221 may include one or more internal voids 234 defined within the airfoil 202. The internal void 234 may comprise a cavity, a passageway, a channel, a pocket, a hollow, or other void within the airfoil 202. As shown in the embodiment of FIG. 3, the internal void 234 may include a forward cavity 236, a rearward cavity 238, and an internal channel 240. An internal wall 242 may separate the forward cavity 236 and the rearward cavity 238. The internal channel 240 may fluidly connect the forward and rearward cavities 236, 238. In some embodiments, the internal channel 240 may also be directed toward a predetermined area of the interior surface 230 for impingement cooling purposes. The internal channel 240 may have a width (e.g., a diameter), which is indicated at 244.

The cooling system 221 may additionally include the cooling apertures 222 mentioned above. One of the cooling apertures 222 is included in FIG. 3 and is shown in detail in FIG. 4A. The cooling aperture 222 may extend through the second portion 212 of the outer wall 209, between the exterior surface 228 and the interior surface 230. An outer end 246 of the cooling aperture 222 may be disposed proximate the exterior surface 228 of the outer wall 209. An inner end 248 of the cooling aperture 222 may be disposed proximate the interior surface 230 of the outer wall 209.

The cooling aperture 222 may be in fluid communication with the internal void 234 in some embodiments. For example, the inner end 248 may be fluidly connected and open to the forward cavity 236 in some embodiments. Thus, cooling fluid may flow from the forward cavity 236, into the inner end 248 of the cooling aperture, and out of the airfoil 202 via the outer end 246. Thus, the inner end 248 may define an inlet of the cooling aperture 222, and the outer end 246 may define an outlet of the cooling aperture 222.

Figure 4A:
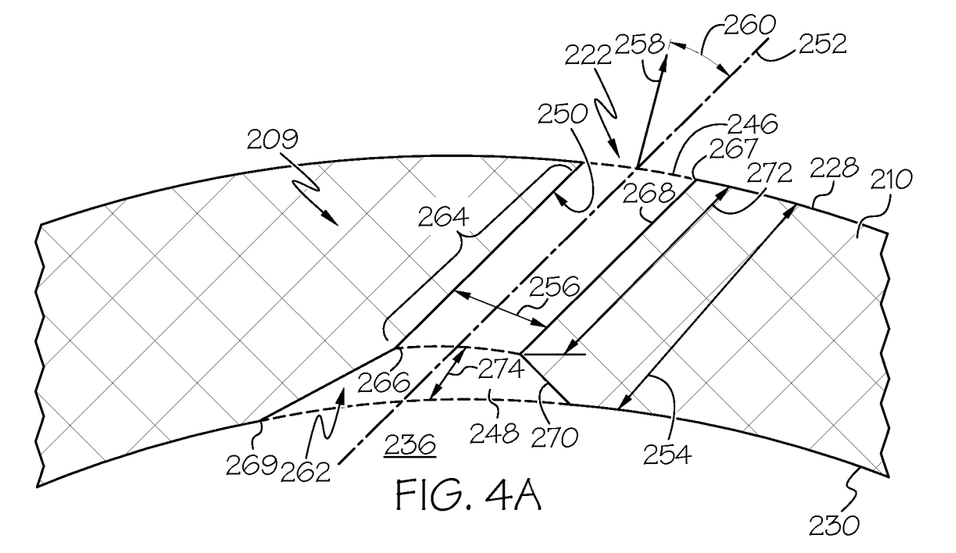
FIG. 4A is a detail view of an outer wall and a cooling aperture of the airfoil of FIG. 3 according to an example embodiment.

As shown in FIG. 4A, the cooling aperture 222 may extend generally along an axis 252. In some embodiments, the axis 252 may be substantially straight. In some embodiments, the axis 252 of the aperture 222 may be canted (i.e., disposed at an angle) relative to the exterior surface 228 of the airfoil 202. In other words, as shown in FIG. 4A, the axis 252 of the aperture 222 may be disposed at a positive, acute angle 260 relative to an intersecting imaginary line 258 that extends normal to the adjacent exterior surface 228 of the airfoil 202. The angle 260 may be chosen according to a desired film cooling airflow delivered to the exterior surface 228. For example, in the embodiment illustrated, the angle 260 allows cooling air to exit the cooling aperture 222 and flow generally along the exterior surface 228, toward the trailing edge 216. In some embodiments, the axis 252 may be between approximately zero and seventy-eight degrees (0°-78°) relative to the line 258. Also, the axis 252 may be disposed at any angle relative to the gas flow direction (e.g., typically between zero and ninety degrees (0°-90°) from the downstream direction).

The cooling aperture 222 may have a length 254 that is measured along (e.g., parallel to) the axis 252. The length 254 may be measured from the outer end 246 to the inner end 248 of the cooling aperture 222.

The cooling aperture 222 may also have a width 256 (e.g., diameter). The width 256 may be measured transverse to (e.g., perpendicular to) the axis 252 between opposing areas of an inner surface 250 of the aperture 222.

There may be several differences between the cooling apertures 222 and other features of the cooling system 221. Specifically, the cooling apertures 222 may extend through the exterior surface 228 of the airfoil 202, whereas the forward cavity 236, rear cavity 238, and internal channel 240 are enclosed within the airfoil 202. Also, the width 256 of the cooling apertures 222 may be substantially smaller than the width 244 of the internal channel 240. Specifically, whereas the internal channel 240 may have a width 244 of at least 0.040 inches, the cooling aperture 222 may have a width 256 between approximately 0.012 to 0.030 inches. Also, the cooling apertures 222 may provide cooling (e.g., film cooling) to the exterior surface 228, whereas the forward cavity 236, rear cavity 238, and/or internal channel 240 may provide cooling to the interior surface 230.

As shown in FIG. 4A, the cooling aperture 222 may be subdivided into various portions along its length 254. For example, the cooling aperture 222 may include an inlet portion 262 and an outlet portion 264. The inlet and outlet portions 262, 264 may be in fluid communication with each other. Also, the outlet portion 264 may intersect the inlet portion 262 at an intersection 266. The intersection 266 may extend continuously and annularly about the axis 252. In some embodiments, the intersection 266 may be substantially circular. In other embodiments, the intersection 266 may be substantially ovate.

As shown in FIG. 4A, the outlet portion 264 may be defined by an outlet surface 268. The outlet surface 268 may extend along the axis 252 between the intersection 266 and an outer rim 267 proximate the exterior surface 228 of the airfoil 202. In some embodiments, the width 256 (i.e., diameter) of the outlet portion 264 may remain substantially constant along its length 272 from the intersection 266 to the exterior surface 228. Also, the outlet surface 268 may be centered about the axis 252 in some embodiments. Thus, as explained above, the outlet portion 264 may be disposed at an angle 260 relative to the exterior surface 228 of the airfoil 202.

The inlet portion 262 may be defined by a concave inlet surface 270. The inlet surface 270 may extend along the axis 252 between an inner rim 269 and the intersection 266. In some embodiments, the width 256 of the inlet portion 262 may vary along its length from the inner rim 269 to the intersection 266. For example, the width 256 may gradually reduce (e.g., taper) from the inner rim 269 to the intersection 266. Stated differently, the width 256 of the inlet portion 262 at the intersection 266 may be substantially equal to the width 256 of the outlet portion 264 at the intersection as shown in FIG. 4A. In other embodiments that will be discussed below, the width 256 of the inlet portion 262 at the intersection 266 may be greater than the width 256 of the outlet portion 264 at the intersection 266. In this latter embodiment, a step may be defined at the transition 266. Also, in some embodiments, at least part of the concave inlet surface 270 may face generally toward the central, interior region of the airfoil 202. As such, the concave inlet surface 270 of the inlet portion 262 may be considered part of the interior surface 230 of the outer wall 209.

The inlet surface 270 may be defined according to a variety of shapes. For example, the inlet surface 270 may be at least partially conic (e.g., frustoconic) in some embodiments. As such, the inlet surface 270 may have two-dimensional curvature. In other embodiments, the inlet portion 262 may be concave and generally dome-shaped, hemispherical, or otherwise rounded. As such, the inlet surface 270 may have three-dimensional curvature.

In some embodiments, the frustoconic inlet portion 262 may be substantially centered about the axis 252. Thus, as shown in FIG. 4A, the axis 252 of the inlet portion 262 may be disposed at an angle 260 relative to the adjacent areas of the interior surface 230 of the outer wall 209. Accordingly, the inlet portion 262 and the outlet portion 264 may be canted generally toward the trailing edge 216 of the airfoil 202.

Figure 4B:
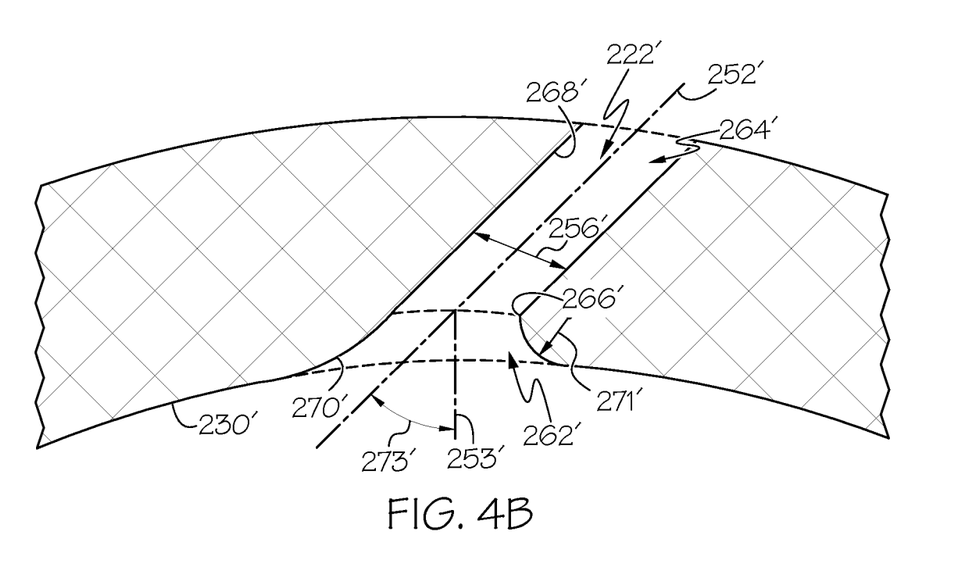
FIG. 4B is a detail view of the outer wall and the cooling aperture of the airfoil of FIG. 3 according to an additional example embodiment.

FIG. 4B shows additional embodiments of the inlet portion 262' of the cooling aperture 222'. As shown, the inlet surface 270' may be contoured convexly in cross section. The inlet surface 270' may have a radius 271' that provides a smooth transition from adjacent areas of the interior surface 230' to the outlet surface 268'. Also, as shown in FIG. 4B, the inlet portion 262' may be centered about an axis 253'. The axis 253' may be disposed at an angle 273' relative to the axis 252' of the outlet portion 264'. The axis 253' may intersect the axis 252' proximate the intersection 266' in some embodiments. Also, while the axis 253' is shown as a straight axis in FIG. 4B, the axis 253' may be curved in other embodiments. It will be appreciated that the axis 253' and other characteristics of the inlet portion 262' may be chosen according to desired flow characteristics for the cooling aperture 222'. For the remaining discussion, the embodiment of FIG. 4A will be discussed. However, it will be appreciated that the disclosure may relate to the embodiment of FIG. 4B as well.

In some embodiments, the outlet portion 264 may comprise the majority of the length 254 of the cooling aperture 222. Also, the length of the outlet portion 264 (measured from the outer rim 267 to the intersection 266 in FIG. 4A) may be at least 1× the width 256 of outlet portion 264. For example, the depth 274 of the inlet portion 262 (measured, for example, between the inner rim 269 and the intersection 266) may be, at most, one third (⅓) of the length 254 of the cooling aperture 222. In some embodiments, a ratio of the depth 274 of the inlet portion 262 to the length of the outlet portion 264 may be approximately 0.1-0.5 for outlet portions 264 that are under 0.5 inches in diameter. The ratio of the depth 274 to the length of the outlet portion 264 may be 0.05-0.4 for outlet portions 264 that are larger than 0.5 inches in diameter. Additionally, in embodiments like those illustrated in FIG. 4A, the width 256 of the inlet and outlet portions 262, 264 may be substantially equal at the intersection 266. In other embodiments, the width 256 of the inlet portion 262 at the intersection 266 may be somewhat greater than the width 256 of the outlet portion 264 at the intersection 266. In either case, the width 256 of the inlet portion 262 at the intersection 266 is, at most, 1.4 times (1.4×) the width 256 of the outlet portion 264 at the intersection 266. These dimensions yield significant flow increases for the cooling aperture 222, and yet the airfoil 202 may remain quite strong and robust. Also, these dimensions ensure that the airfoil 202 can be highly manufactureable. Additionally, these dimensions may account for tolerancing in the manufacturing process (e.g., when forming the outlet portion 264 to intersect the inlet portion 262). It will be appreciated that these dimensions can apply to the embodiment of FIG. 4B. For example, the ratio of the radius 271' to the length of the outlet portion 264' may be approximately 0.1-0.5 for outlet portions 264' that are under 0.5 inches in diameter. Also, the ratio of the radius 271' to the length of the outlet portion 264' may be 0.05-0.4 for outlet portions 264' that are larger than 0.5 inches in diameter. Also, in the embodiment of FIG. 4B, the ratio of the radius 271' to the width 256' of the outlet portion 264' may be approximately 0.05 to 0.5.

The inlet portion 262 may be open to the forward cavity 236 within the airfoil 202. The outlet portion 264 may be in fluid communication with the inlet portion 262. Therefore, a fluid flowpath may be defined from the forward cavity 236, to the inlet portion 262, and out of the airfoil 202 via the outlet portion 264 for film cooling of the airfoil 202.

The inlet portion 262 may define a widened and shaped inlet portion of the cooling aperture 222. The inlet portion 262 may provide a gradual transition along the interior surface 230 to the outlet portion 264. In some embodiments, the inlet portion 262 may define a chamfer or chamfer-like feature for the outlet portion 264 of the cooling aperture 222. Thus, the profile of the inlet surface 270, the tapering width 256 of the inlet portion 262, and/or other features may increase fluid flow through the cooling aperture 222. As a result, the airfoil 202 may be cooled more efficiently and effectively. Also, because the inlet portion 262 increases fluid flow, the width 256 of the outlet portion 264 may be reduced, making the outer wall 209 stronger and more robust.

Figure 5:
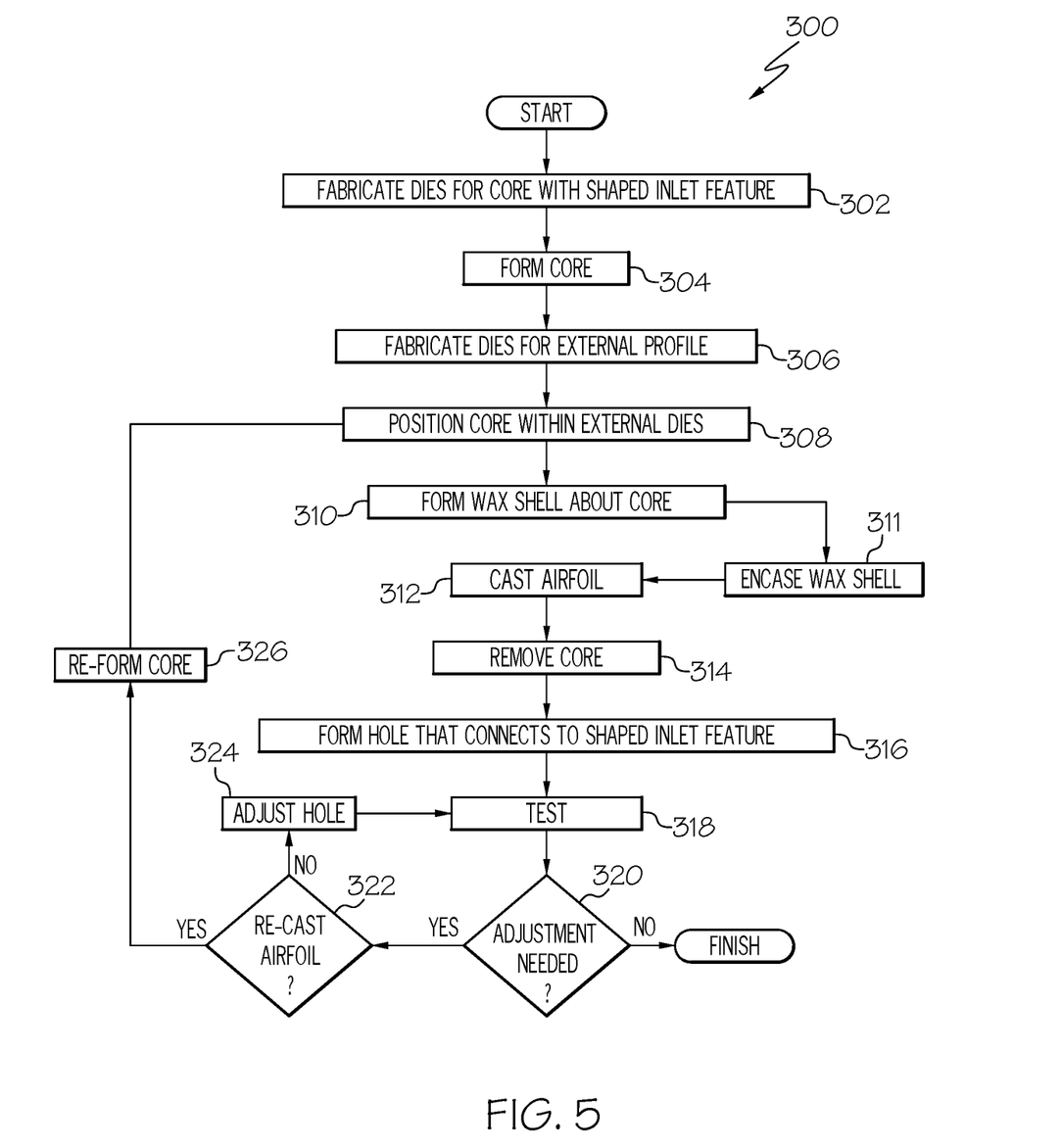
FIG. 5 is a flowchart illustrating a method of manufacturing the gas turbine component of FIG. 2.

Methods of manufacturing the airfoil 202 will now be discussed with reference to FIGS. 5-20B. An example embodiment of the method 300 is illustrated in FIG. 5. The method 300 is illustrated schematically in FIGS. 6-20B as will be discussed.

Figure 6:
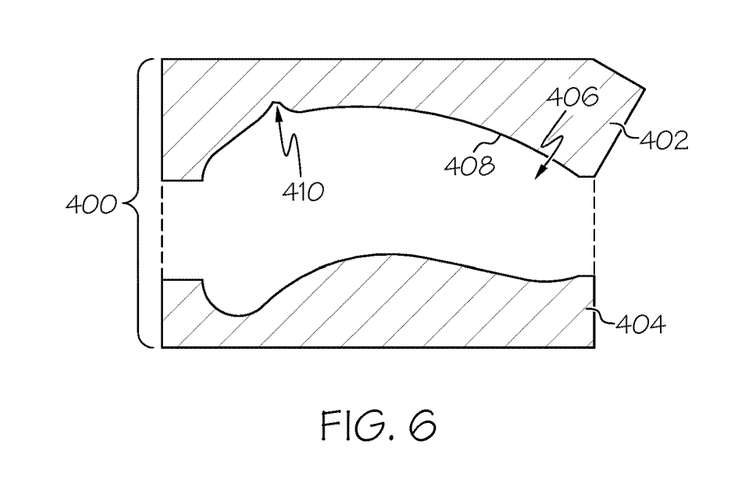

As shown in FIG. 5, the method 300 may begin at 302, in which a die (i.e., a "core die") is formed, such as the die 400 illustrated schematically in FIG. 6. As shown, the die 400 may include a first member 402 and a second member 404 that cooperate to define an internal cavity 406. In other words, the first member 402 and second member 404 may define an internal surface 408, and the internal surface 408 may define an internal cavity 406 of the die 400.

Figure 7:
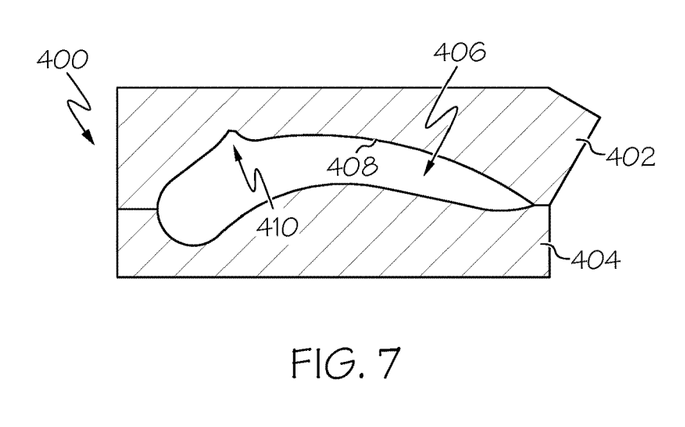

As shown in FIGS. 6 and 7, the internal surface 408 is shaped to include a core die feature 410. The core die feature 410 may be a concave feature that corresponds substantially to the inlet portion 262 of the cooling aperture 222 of FIGS. 3 and 4. The core die feature 410 may be shaped substantially the same as the inlet portion 262 of the cooling aperture 222 described above. Thus, the core die feature 410 may be a recess, void, pocket, or other concave feature in the internal surface 408. It will be understood that the inlet portion 262 of the cooling aperture 222 may ultimately correspond in shape to the core die feature 410.

Figure 8:
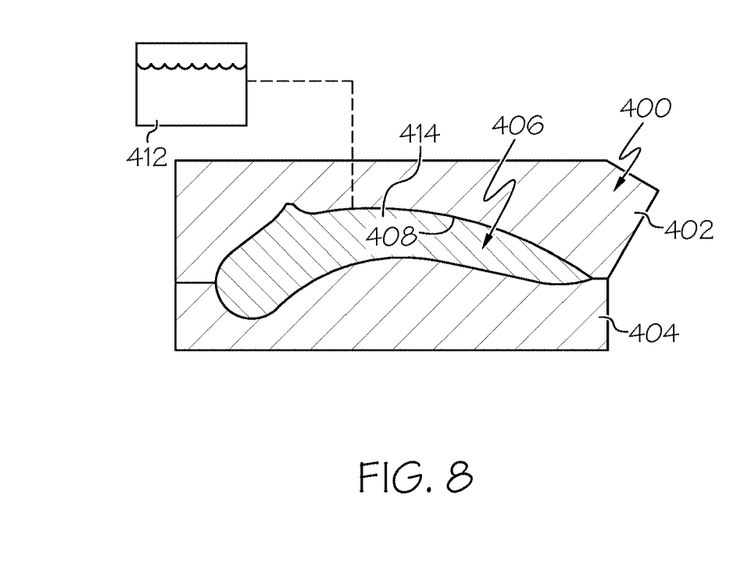
Figure 9:
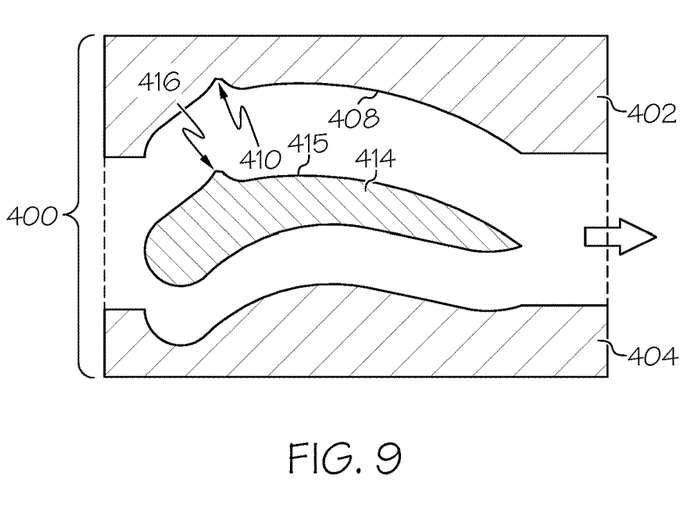

Next, the method 300 of FIG. 5 may continue at 304, in which a core 414 is formed within the internal cavity 406 of the core die 400. As shown in FIG. 8, a core material 412, such as a ceramic material, may be provided to the internal cavity 406. The core material 412 may be molded within the internal cavity 406 and cured to form the core 414. An outer surface 415 of the core 414 may correspond to the internal surface 408 of the internal cavity 406 of the core die 400. Thus, the core outer surface 415 may include a core feature 416. The core feature 416 may be a projection that corresponds in shape substantially to the core die feature 410. More specifically, the core feature 416 may be inversely shaped according to the core die feature 410. Then, as shown in FIG. 9, the core 414 may be removed from the core die 400.

It will be appreciated that the core 414 may be formed in other ways as well. For example, additive manufacturing techniques (e.g., 3D printing) may be employed for forming the core 414. These techniques may also be used to form the core feature 416 of the core 414.

Figure 10:
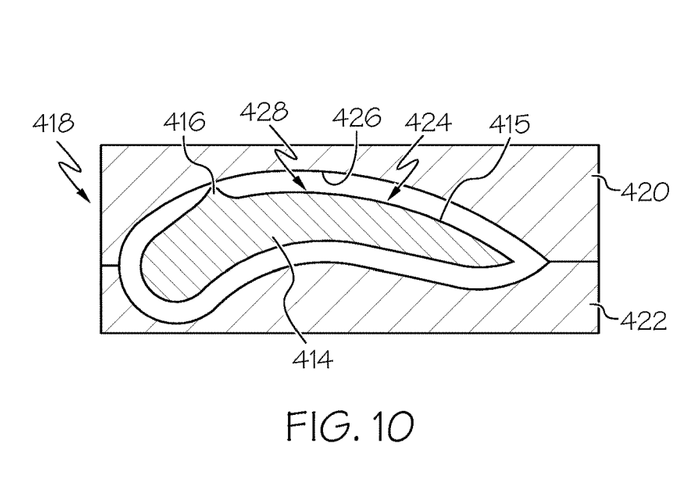
Figure 11:
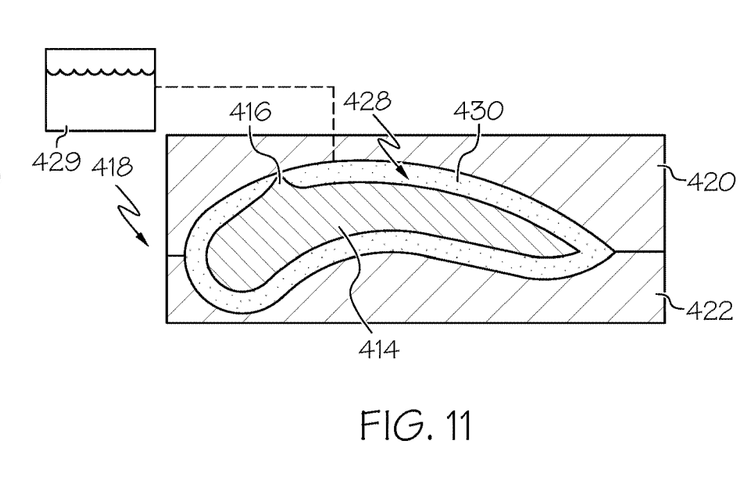
Figure 12:
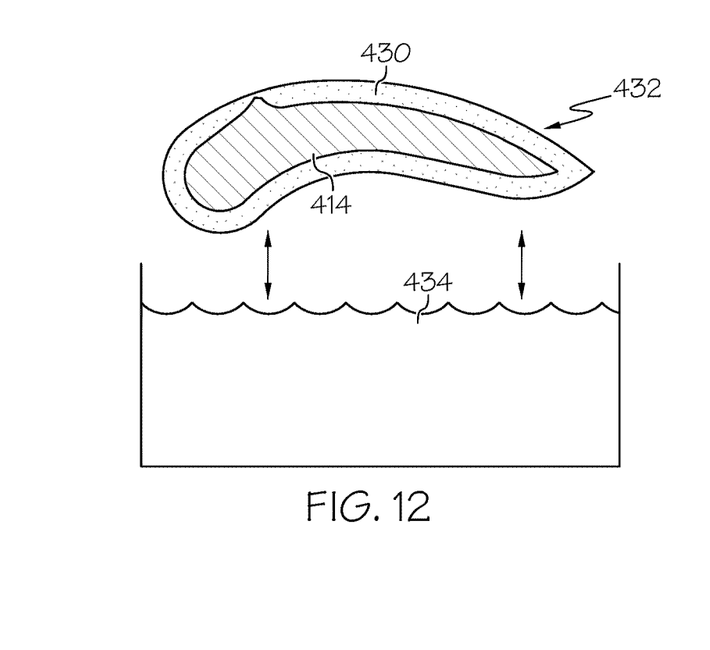

Subsequently, the method 300 may continue at 306, in which a tool 418 is fabricated. As shown in FIG. 10, the tool 418 may include a first member 420 and a second member 422, which cooperate to define an internal cavity 424. In other words, the first and second members 422 may include respective inner surfaces 426 that define the cavity 424. The inner surfaces 426 may correspond, in some embodiments, to the exterior surface 228 of the airfoil 202. Thus, as will be discussed, the exterior surface 228 may be formed substantially according to the inner surfaces 426.

Next, at 308, the core 414 may be disposed within the cavity 424 as shown in FIG. 10. The core 414 may be supported within the cavity 424 so as to define a region 428 between the outer surface 415 of the core 414 and the internal surface 426 of the tool 418.

Subsequently, at 310 of the method 300, a shell material 429, such as wax, may be provided within the region 428. The shell material 429 may be hardened to define a shell 430 about the core 414. Accordingly, a first intermediate article 432 may be formed that includes the core 414 and the shell 430.

Figure 13:
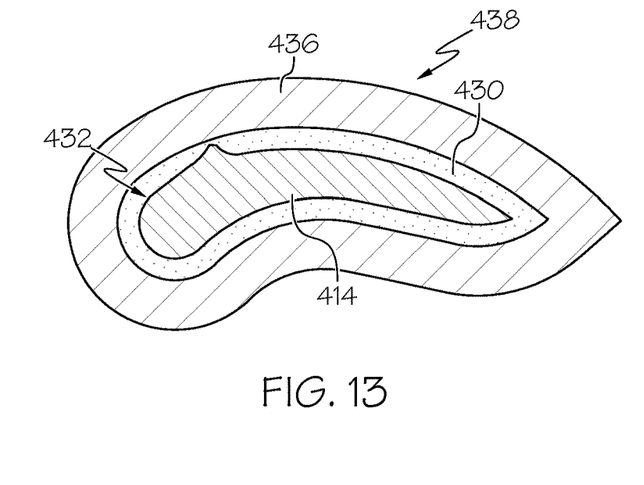
Figure 14:
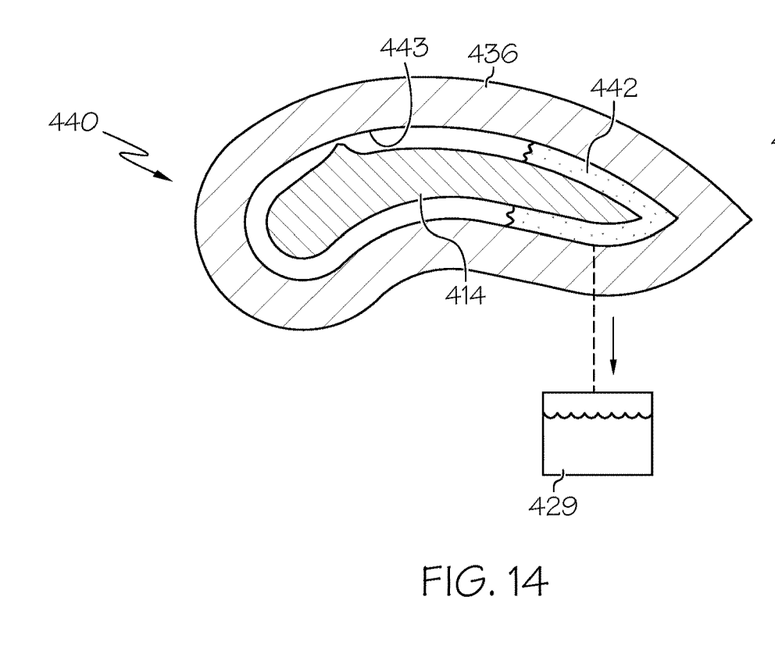

The method 300 may continue at 311. At 311, the first intermediate article 432 may be removed from the cavity 424 of the tool 418, and the first intermediate article 432 may be dipped one or more times in a slurry material 434. The slurry material 434 may be a ceramic material. As shown in FIG. 13, the slurry material 434 may harden about and encase the first intermediate article 432 in a second shell 436 to define a second intermediate article 438, which includes the second shell 436, the first shell 430, and the core 414. Subsequently, as shown in FIG. 14, the first shell material 429 may be removed. For example, the first shell material 429 may be melted out. Once the first shell material 429 is removed, a third intermediate article 440 may be formed with an open region 442 defined between the outer surface 415 of the core 414 and an internal surface 443 of the shell 436.

Figure 15:
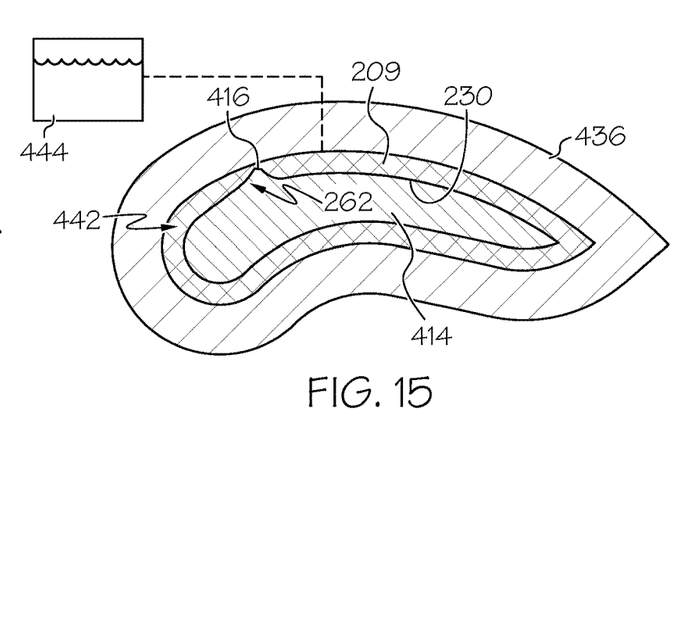

Then, at 312 of the method 300, the airfoil 202 may be cast about the core 414 and within the region 442. Specifically, as shown in FIG. 15, an airfoil material 444 may be provided to the region 442. The airfoil material 444 may be cured to form the outer wall 209 and other portions of the airfoil 202. As shown in FIG. 15, the interior surface 230 of the outer wall 209 may be cast and formed according to the outer surface 415 of the core 414 such that the interior surface 230 includes the inverse of the core feature 416. Accordingly, the inlet portion 262 is formed on the interior surface 230 of the outer wall 209 according to the core feature 416.

Figure 16:
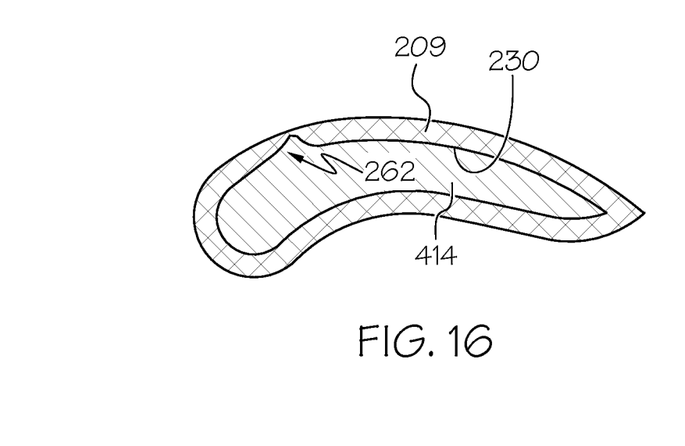
Figure 17:
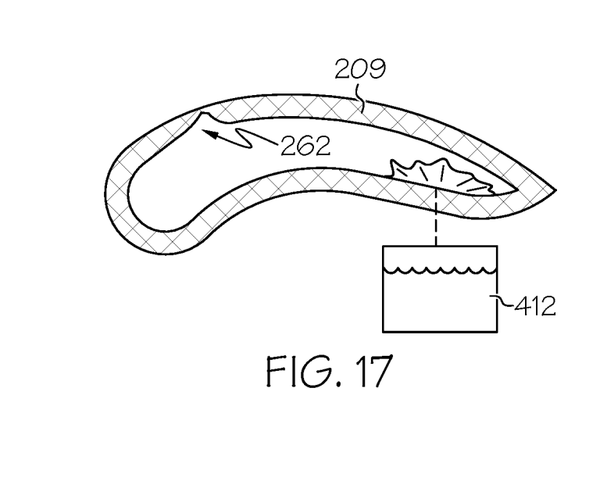

Then, as shown in FIG. 16, the second shell 436 may be removed, for example, by breaking the second shell 436 to reveal the outer wall 209. Next, at 314 of the method 300, the core 414 may be removed. For example, the core material 412 may be chemically leached from within the outer wall 209, leaving the hollow airfoil 202.

Figure 18:
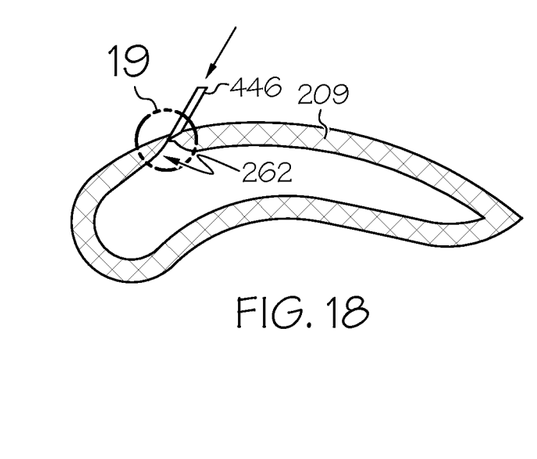
Figures 19, 20A, 20B:
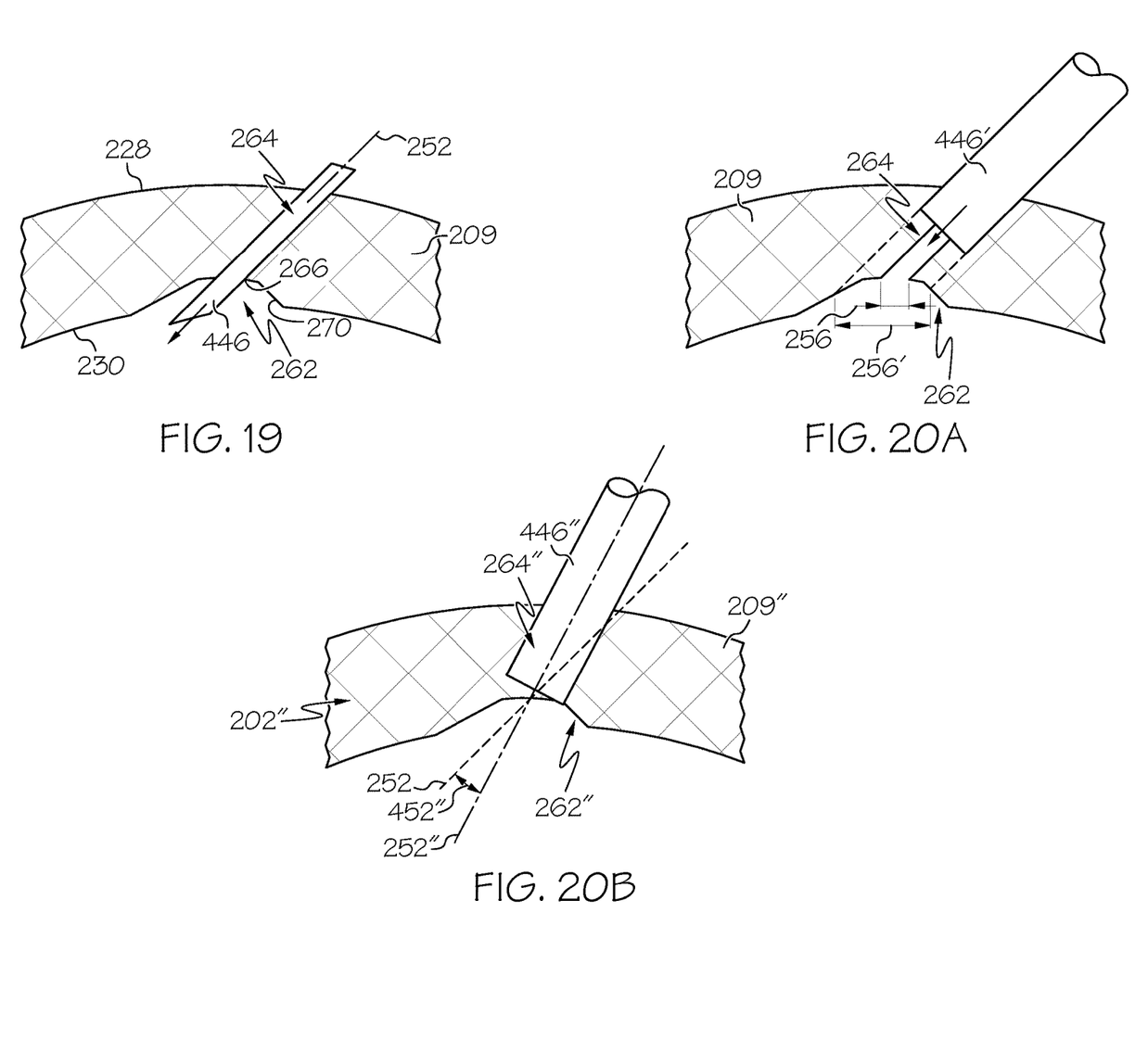

Subsequently, at 316 of the method 300, the outlet portion 264 of the cooling aperture 222 may be formed. For example, as shown in FIGS. 18 and 19, the outlet portion 264 may be formed by EDM, drilling, laser drilling, or other machining methods. A cutting tool 446, such as a wire, drill bit, laser cutting tool, etc., may progressively remove material through the outer wall 209 in a direction from the exterior surface 228 toward the interior surface 230 to form the outlet portion 264. The outlet portion 264 may be cut so that it intersects with the inlet portion 262 of the cooling aperture 222 at the intersection 266. Once the outlet portion 264 is formed, what remains may be the airfoil 202 with the cooling aperture 222 shown in FIGS. 3, 4A, and/or 4B. The cooling aperture 222 will include the outlet portion 264 as well as the gradually widening inlet portion 262.

During the development process of a cooled vane or blade, the orientation and diameter of the cooling aperture 222 may change based on test results. There may also be tolerances on where the intersection 266 is located on the inner surface 230 (i.e., where the outlet portion 264 breaks out on the inner surface 230). Accordingly, in some embodiments (for example, in which the airfoil 202 is to be tested before in-flight use), the method 300 may continue at 318. At 318, the airfoil 202 may be tested, for example, to determine the flow and cooling characteristics of the cooling aperture 222. In some embodiments, the airfoil 202 may be tested in connection with CFD modeling techniques and tools.

Next, the method 300 may continue to 320, wherein it determined whether to adjust the cooling aperture 222 to provide more desirable flow and cooling characteristics. If no adjustments are needed, the method 300 may finish. If, on the other hand, the testing of 318 indicates that adjustments are needed for the cooling aperture 222, then the method may continue to 322.

At 322, it may be determined whether it is necessary to re-cast the airfoil 202. In some cases, such as the embodiment of FIG. 20A, the cooling aperture 222 may be adjusted without the need to re-cast the airfoil 202 (i.e., 322 answered negatively). Thus, at 324 of the method 300, the outlet portion 264 of the cooling aperture 222 formed at 316 (and illustrated in FIG. 19) is re-formed, re-machined, reamed, re-drilled, re-conditioned, or otherwise adjusted. Specifically, in FIG. 20A, the original width 256 of the outlet portion 264 is increased to a larger width 256'. In some embodiments, a larger diameter cutting tool 446' (larger than the cutting tool 446 of FIG. 19) may be used to widen the outlet portion 264. Accordingly, the transition between the inlet and outlet portions 262, 264 may be made to be more gradual. For example, a sharp corner and/or step at the intersection of the inlet and outlet portions 262, 264 may be removed. This may improve flow characteristics through the cooling aperture 222. After adjustments are made at 324, the method 300 may loop back to the testing of 318 and the adjustment inquiry of 320. If more adjustments are needed, then the method 300 may continue to 322 and so on. If there are no further adjustments needed, then the method 300 may end.

In other embodiments of 322 of the method 300, it may be necessary to re-cast the airfoil 202 (i.e., 322 answered positively). Thus, the method 300 may continue to 326, wherein the core 414 is re-formed. The core 414 may be re-formed using the same core die 400 formed at 302 and illustrated in FIGS. 6-8. Next, the method 300 may loop back to 308 and proceed as discussed above until the airfoil 202 is re-cast at 312. The core 414 may then be removed at 314. Next, at 316, the outlet portion 264 may be formed in the re-cast airfoil 202" as illustrated in FIG. 20B. As shown, a cutting tool 446" may be used to form the outlet portion 264" through the re-cast outer wall 209". In some embodiments, the cutting tool 446" may have a greater width (i.e., greater diameter) than the cutting tool 446 used previously (FIG. 19). Also, as shown in FIG. 20B, the outlet portion 264" may be formed along a different axis 252". Specifically, the outlet portion 264" may be formed to extend through the outer wall 209 along an axis 252" that is disposed at an angle 452" relative to the original axis 252. Then, the method 300 may continue to the testing of 318 and the adjustment inquiry of 320. If more adjustments are needed, then the method 300 may continue to 322 and so on. If no further adjustments are necessary, then the method 300 end.

It will be appreciated that the adjustments shown in FIGS. 20A and 20B may be made in a convenient and efficient way. For example, in the case of FIG. 20A, the outlet portion 264 can be widened without having to make a new core, new molding dies or tools, etc. Additionally, in the case of FIG. 20B, the outlet portion 264" may be widened and re-oriented without having to make a new core die 400, etc.

Figure 21:
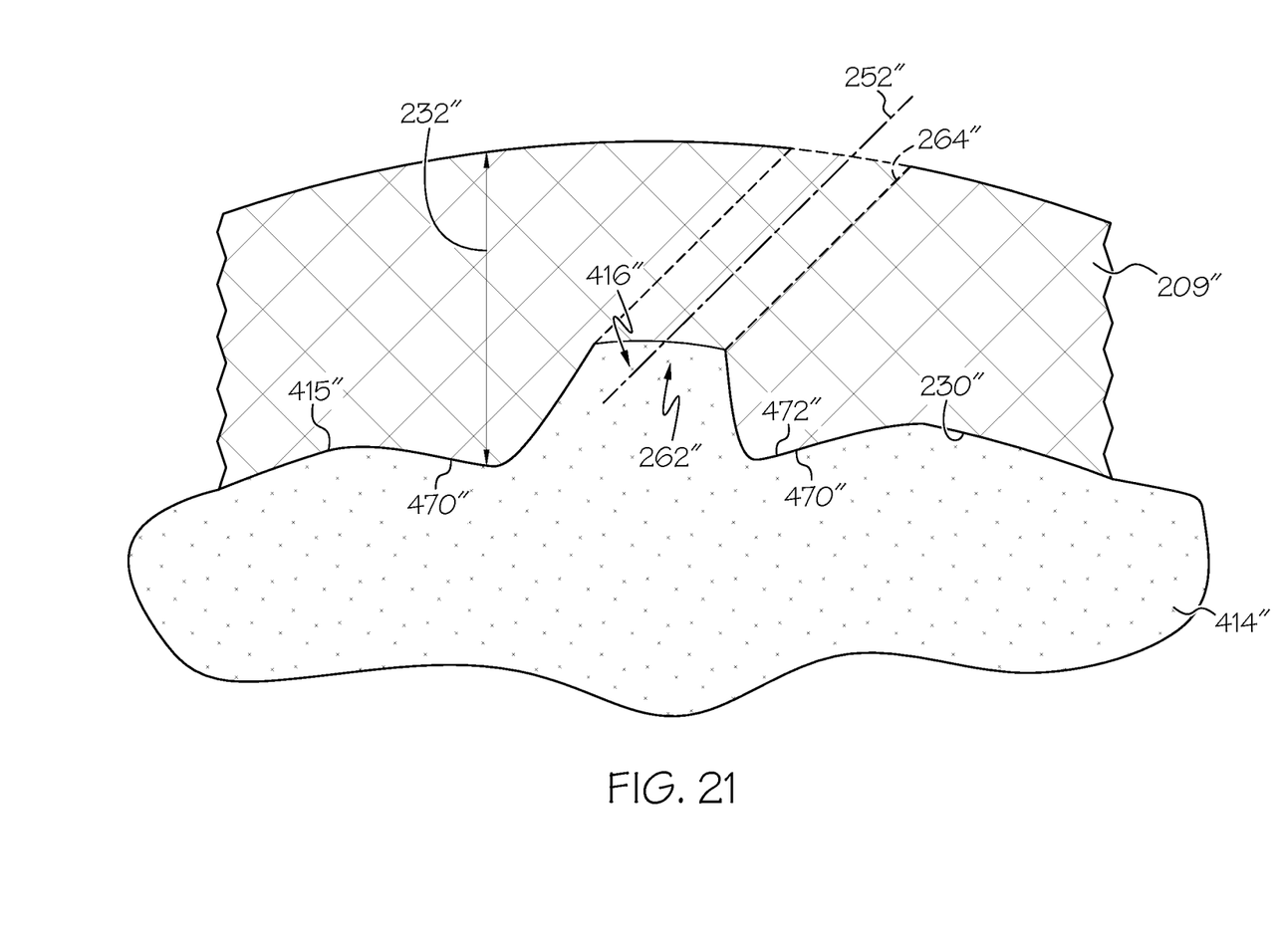
FIG. 21 is a detail view of the outer wall and cooling aperture of the airfoil according to additional embodiments of the present disclosure.

Referring now to FIG. 21, alternative embodiments of the present disclosure will now be discussed. FIG. 21 shows a cross section of the outer wall 209". The cross section of the outer wall 209" may be substantially similar to the outer wall 209 shown in FIG. 4, except that the outlet portion 264" has not been drilled and is only shown in phantom.

As shown in FIG. 21, the areas of the outer wall 209" that are adjacent to the inlet portion 262" may include a thickened area 470". The thickened area 470" may provide added thickness 232" that is localized about the concavity of the inlet portion 262". Accordingly, the thickened area 470' provides added strength and reinforcement proximate the inlet portion 262". The thickened area 470" may be annular and may project toward the central region of the wall 209". The thickened area 470" may continuously surround the inlet portion 262" about the axis 252".

It will be appreciated that the manufacturing method 300 discussed above may be used to manufacture the thickened area 470" and other areas of the outer wall 209". For example, at 312 of the method 300, the outer wall 209" may be cast about a core 414", and the inner surface 230" (including the thickened area 470") may be formed according to the outer surface 415" of the core 414". The core 414" may include a recess 472", and the core feature 416" may project outwardly from the recess 472". Thus, the thickened area 470" may be formed inversely according to the surfaces of the recess 472". Likewise, the inlet portion 262" may be formed inversely according to the surfaces of the core feature 416".

Accordingly, the shaped inlet portions 262 of the cooling apertures 222 of the airfoil 202 provide several advantages. The shaped inlet portion 262 improves the flow coefficient of the cooling aperture 222, allowing more air to pass through a given hole width 256. For an aperture 222 that is perpendicular to the wall 209, the shaped inlet portion 262 can increase flow at least 15%, to 40%. Moreover, in cases in which the shaped inlet portion 262 extends continuously about the axis 252 of the outlet portion 264, the flow can be less sensitive to variations in the direction of flow and wall thickness variations. Additionally, the cooling apertures 222 can be less likely to plug with dirt or other debris because the inlet portion 262 is tapered instead of having a sharp inlet edge. This is because flow through the cooling apertures 222 is less likely to result in recirculation zones, which can cause particle build-up. Moreover, the shaped inlet portions 262 can direct and channel the air, minimizing flow separations within the aperture. Accordingly, film cooling can occur in an effective manner.

Furthermore, manufacturing of the airfoil 202 can be completed in an efficient manner. The casting and subsequent drilling or EDM methods described above can be completed in a controlled fashion for high manufacturing accuracy. The methods provide time savings as well. Also, testing and adjusting the cooling apertures 222 may be completed in a convenient manner because, instead of having to form another core with new tooling, molds, etc., the outlet portion 264 can be adjusted by re-drilling as discussed above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A method of manufacturing a cooled gas turbine component for a gas turbine engine, the method comprising:
    forming a core with an outer surface, the outer surface including a core feature that projects from the core;
    casting an outer wall of an airfoil about the core including casting a portion of the outer wall that covers the core feature and projecting the core feature partially into a thickness of the outer wall, the portion including an exterior surface and an interior surface, the interior surface defining a shaped inlet portion that is cast to inversely correspond to the core feature; and
    after casting the outer wall, forming an outlet portion through the outer wall by progressively removing material through the portion of the outer wall in a direction from the exterior surface toward the interior surface and toward the shaped inlet portion to fluidly connect the outlet portion to the shaped inlet portion, the shaped inlet portion and the outlet portion cooperatively defining a cooling aperture through the outer wall.

2. The method of claim 1, further comprising adjusting the outlet portion by changing a dimension of the outlet portion.

3. The method of manufacturing of claim 1,
    wherein forming the core includes forming the core feature to be at least partially conic.

4. The method of manufacturing of claim 1, wherein forming the outlet portion includes extending the outlet portion along an axis;
    wherein the axis extends at an acute angle relative to the exterior surface of the outer wall.

5. The method of claim 1, wherein forming the outlet portion includes forming the outlet portion to have a substantially constant width along a length of the outlet portion.

6. The method of claim 1, wherein forming the outlet portion includes extending the aperture through the shaped inlet portion, leaving at least part of the shaped inlet portion continuously encompassing the outlet portion.

7. The method of claim 1, wherein forming the core includes molding the core within a die.

8. The method of claim 1, wherein forming the core includes forming a recess on the outer surface of the core; and
wherein forming the core includes forming the core feature as a projection that is disposed in the recess.

9. The method of claim 1, wherein a depth of the inlet portion is, at most, one third of a length of the cooling aperture.

10. The method of claim 1, wherein the inlet portion comprises a chamfer of the outlet portion.

11. The method of claim 1, wherein casting the outer wall includes forming the shaped inlet portion to have a convex curvature.

12. The method of claim 1, wherein casting the outer wall includes forming the shaped inlet portion to have a width that varies.

13. A method of manufacturing a cooled gas turbine component for a gas turbine engine, the method comprising:
forming a core with an outer surface, the outer surface including a core feature;
casting an outer wall of an airfoil about the core including casting a portion of the outer wall that covers the core feature, the portion including an exterior surface and an interior surface, the interior surface defining a shaped inlet portion that is cast to inversely correspond to the core feature;
after casting the outer wall, forming an outlet portion through the outer wall by progressively removing material through the portion of the outer wall in a direction from the exterior surface toward the interior surface and toward the shaped inlet portion to fluidly connect the outlet portion to the shaped inlet portion, the shaped inlet portion and the outlet portion cooperatively defining a cooling aperture through the outer wall;
re-casting the outer wall; and
forming an adjusted outlet portion through the re-cast outer wall.

14. The method of claim 13, wherein forming the outlet portion through the outer wall includes forming the outlet portion at a first axis relative to the exterior surface of the outer wall;
wherein forming the adjusted outlet portion through the re-cast outer wall includes forming the adjusted outlet portion at a second axis relative to an exterior surface of the re-cast outer wall; and
wherein the second axis is disposed at an angle relative to the first axis.

15. A method of manufacturing a cooled gas turbine component for a gas turbine engine, the method comprising:
forming a core with an outer surface, the outer surface including a core feature that projects from the core;
casting an outer wall of an airfoil about the core including casting a portion of the outer wall that covers the core feature, the portion including an exterior surface and an interior surface, the interior surface defining a shaped inlet portion that is cast to inversely correspond to the core feature; and
after casting the outer wall, forming an outlet portion through the outer wall by progressively removing material through the portion of the outer wall in a direction from the exterior surface toward the interior surface and toward the shaped inlet portion to fluidly connect the outlet portion to the shaped inlet portion, the shaped inlet portion and the outlet portion cooperatively defining a cooling aperture through the outer wall, the shaped inlet portion having a first width that varies, the outlet portion having a second width that is substantially constant.

16. The method of claim 15, wherein forming the core includes forming the core feature to be at least partially conic.

17. The method of claim 15, wherein forming the outlet portion includes extending the aperture through the shaped inlet portion, leaving at least part of the shaped inlet portion continuously encompassing the outlet portion.

18. The method of claim 15, wherein a depth of the inlet portion is, at most, one third of a length of the cooling aperture.

19. The method of claim 15, wherein the inlet portion comprises a chamfer of the outlet portion.

20. The method of claim 15, wherein casting the outer wall includes forming the shaped inlet portion to have a convex curvature.

* * * * *